July 22, 1969  W. O. DICK  3,457,392
MASKING MEANS FOR SELECTIVE PUNCH CARD DATA TRANSMISSION
Filed April 6, 1965
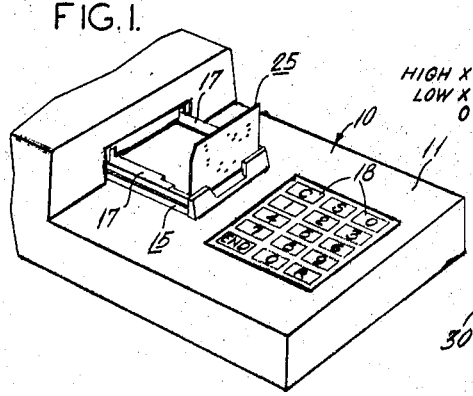
FIG. 1.
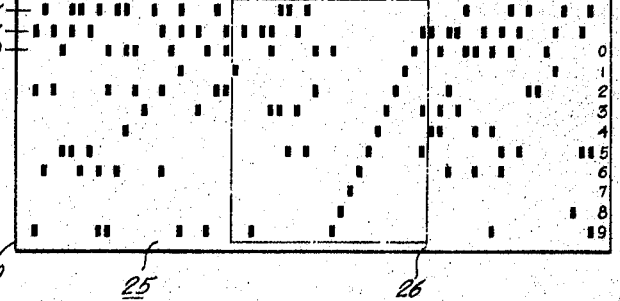
FIG. 2. SELECT-OR-MASK IN ANY 22 CONTINUOUS COLUMNS
FIG. 3.
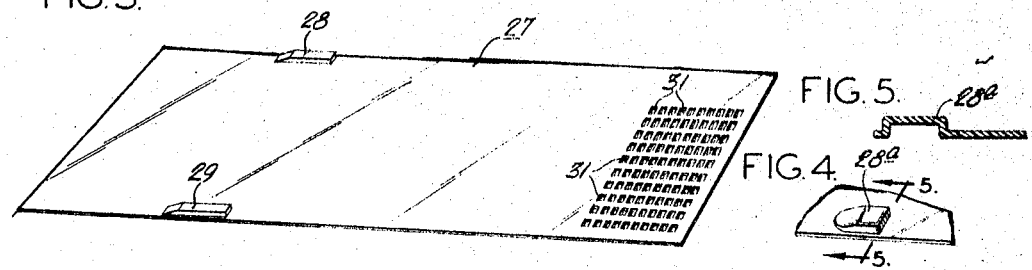
FIG. 5.
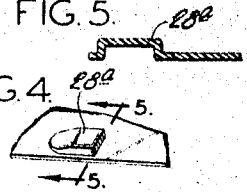
FIG. 4.
FIG. 6.
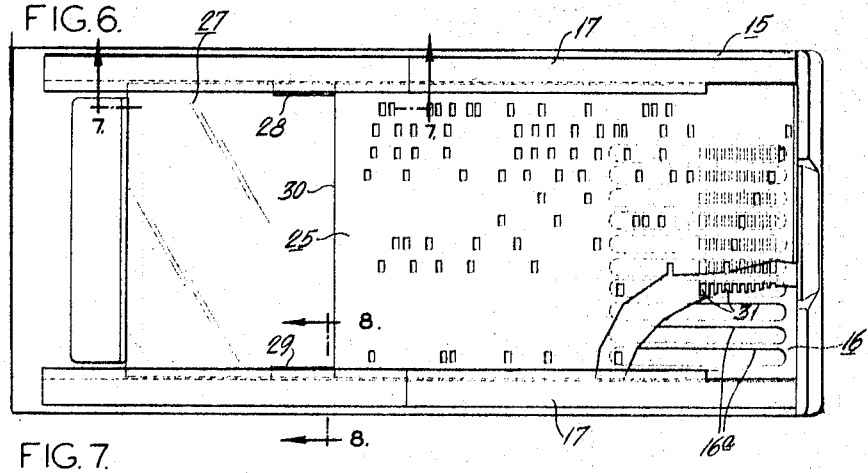
FIG. 7.
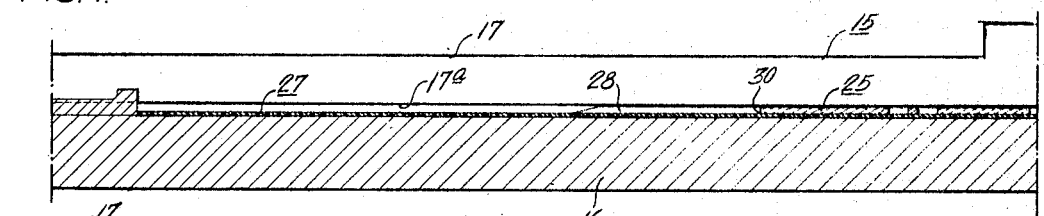
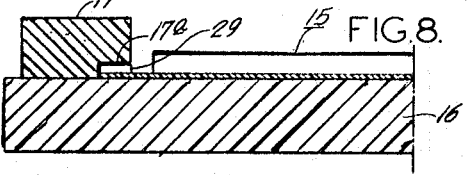
FIG. 8.
INVENTOR:
WINFRED O. DICK
BY Howson & Howson
ATTYS.

United States Patent Office 3,457,392
Patented July 22, 1969

3,457,392
MASKING MEANS FOR SELECTIVE PUNCH CARD
DATA TRANSMISSION
Winfred O. Dick, North Canton, Ohio
(3632 Johnny Cake Lane, Charlotte, N.C. 28211)
Continuation-in-part of application Ser. No. 360,452,
Apr. 16, 1964. This application Apr. 6, 1965, Ser.
No. 445,877
Int. Cl. G06k 7/01
U.S. Cl. 235—61.11       8 Claims

ABSTRACT OF THE DISCLOSURE

This patent discloses a method and apparatus for enabling the transmission of a selected group of columns of data in a punch card from any portion of the card and without diminishing the potential utilization of all columns for storing data in the punch card. This is accomplished by providing a mask having an abutment thereon which is registerable with one terminal edge of the punch card, the mask being adapted for mating in face to face engagement with a portion of the punch card and having punches therein registerable with selected punches in the card whereby only those selected punches are transmitted.

---

This application is a continuation-in-part of application S.N. 360,452, filed on Apr. 16, 1964.

The present invention relates to punch card data transmission and more specifically to a method and a device which permits the transmission of data contained on any portion of a punch card.

As set forth in my copending application. "Punch Card Data Transmission," S.N. 360,452, filed Apr. 16, 1964, at the present time there are two major machines, both produced by International Business Machines Corporation, which permit long distance telephone transmission of punch card data. These two machines are generically referred to as the 1001 Data Transmission machines and more specifically referred to as the numeric IBM 1001 and the alpha-numeric IBM 1001.

As it is generally known, the punches in the punch cards represent indicia, numbers or letters. However, the numeric IBM 1001 is mechanically and electrically so arranged that only the first 22 columns of the punch card inserted therein for transmission, can be transmitted. In addition, the first 22 columns of the punch card can contain nothing but numeric punches or blanks and columns 23 and 24 must additionally be left unpunched or garbled transmission will result. This means, that in all but the exceptional instance, a completely different set of cards must be made up for dataphone transmission than those which are presently utilized in industry for accounting, inventory control, payroll, etc.

In certain instances, where letters are absolutely necessary to complete the data desired to be transmitted, the alpha-numeric IBM 1001 is utilized. However, some of the limitations in the numeric IBM 1001 are also contained in the alpha-numeric IBM 1001. For example, in the alpha-numeric transmission system, only the first 36 columns of punch data may be transmitted. In addition, columns 37 and 38 must be left blank in order for the machine to operate correctly.

The afore-mentioned copending application has for its principal object the provision of a novel method and apparatus for filtering a data card so that punch read-out, in the instance of a numeric type transmitter, only reads numeric information regardless of its position on the card. This permits the use of the same card for both in-house use and for data transmission. In addition, the copending application provides novel apparatus which permits, by a simple modification of the presently existing IBM data transmission machines, any portion of the punch card to be read, thereby not limiting the transmission of data from just the first portion of the card.

In view of the above, it is a principal object of the present invention to provide an improved means and method for data punch transmission which will permit, without modifying the IBM data transmission machine, presently existing data machines to read any portion of the data punch card.

Another object of the present invention is to provide a novel method and apparatus for filtering a data card so that punch read-out will be effected only in the desired portions of the card, wherever desired.

Another object of the present invention is to provide a filter mask which may be utilized in conjunction with either the numeric IBM 1001 or the alpha-numeric IBM 1001 and which permits data transmission of any portion of the desired portion of the card.

Other objects and a fuller understanding of the invention may be had by referring to the following description and claims taken in conjunction with the accompanying drawing in which:

FIG. 1 is a fragmentary perspective view of a portion of an IBM 1001 data transmission machine;

FIG. 2 is a schematically illustrated prepunched IBM card, the blackened rectangular areas representing punches;

FIG. 3 is a perspective view of apparatus constructed in accordance with the present invention and intended to be used in conjunction with the schematic prepunched IBM card of FIG. 2 in a machine such as illustrated in FIG. 1;

FIG. 4 is a fragmentary enlarged perspective view of another embodiment of a portion of the apparatus illustrated in FIG. 3;

FIG. 5 is an enlarged fragmentary sectional view taken along line 5—5 of FIG. 4;

FIG. 6 is a fragmentary enlarged sectional view of the apparatus illustrated in FIG. 3 for use with the prepunched card of FIG. 2 and mounted in the machine of FIG. 1, with a portion of the machine broken away to more clearly illustrate the operation of the present invention;

FIG. 7 is an enlarged fragmentary sectional view taken along line 7—7 of FIG. 6; and FIG. 8 is an enlarged fragmentary sectional view taken along line 8—8 of FIG. 6.

Referring now to the drawing, and especially FIG. 1 thereof, an IBM 1001, designated 10 for purposes of identification, comprise a carriage 15 and as illustrated in FIG. 6 a bottom portion 16, mounting laterally spaced, longitudinally extending shoes 17 having a recessed portion 17a, the shoes being dimensioned for receiving a punch card 25 therein. To the right of the carriage, and as illustrated in FIG. 1, is a plurality of key punches 18 which are mounted in the face 11 of the transmitter 10.

As illustrated in FIG. 6, the underside 16 of the machine has a plurality of longitudinally extending laterally spaced slots 16a having a longitudinal length, in the instance of a numeric IBM 1001 of such as to permit only the first 22 columns of a punched card to be transmitted while in the instance of the alpha-numeric IBM 1001 having a longitudinal length such as to enable the first 36 colunms of the card to be transmitted. In conventional operation, after the punch card has been placed on the carriage 15, the carriage is moved to the left as viewed in FIG. 1, and then released. Releasing the carriage 15 causes punch read-out means, registering with the slots 16a to automatically read and transmit only those punches in the segment of the card in registry with the means. Thus the punch read-out reads only the punches in the individual columns starting with the first column, the carriage moving automatically to the right as the card is read.

For purposes of orientation, the punch card 25 is scored and foldable therealong having a plurality of vertical columns, and a plurality of numbered rows in the present instance ten bearing the indicia 0–9 respectively. There are also two unnumbered rows above the "zero or 0" row designated "high X" and "low X." As is conventional in the IBM punch system, numerals are punched in the numbered row and column numerically corresponding to that of the desired numeral. Letters, on the other hand, are represented by punches in the same column, one in one of the three top rows, high X, low X, or "0" and a number punch in the same column. For reasons which will become evident hereinafter, the particular card selected for the present invention is preferably of the foldable type and having a fold line 26 which may be custom placed along any vertical column of the card.

In order that any 22 or 36 consecutive columns or desired portion thereof desired may be transmitted (dependent on the machine type), and in accordance with the invention, means are provided for insertion in the carriage 15 of the machine 10 to permit insertion of only a portion of the card in the carriage. To this end, stops are provided for insertion in the carriage prior to placing the punch card 25 therein whereby only a limited portion of the card 25, for example up to the fold line 26, may be positioned in the carriage 15. As illustrated in FIG. 3, the stop may take the form of a mask 27 having laterally spaced abutments 28 and 29 thereon for registering with a terminal end 30 of the punch card 25. The mask 27 may be of a form such as that described in the aforementioned copending application, and have a plurality of punches 31 located at the forward end thereof for permitting reading and transmission of only that indicia in the superimposed punch card 25 registering with the punches 31. In this manner the position of the abutments 28 and 29 serve to select the portion of the card 25 to be read while the position of the underlying punches 31 in the mask 27 permits transmission of only those indicia in the card 25 registering therewith.

It is preferable, because of clearance problems with the read-out means overlying the punched portion of the card in the machine 10, to place the abutments on the mask 27 so that the abutments are positioned in the recesses 17a of the shoes 17. (See FIGS. 7 and 8.)

In practice, in most industries there is a conventional setup for the indicia punched on the punch cards in that particular industry, for example in the first 13 columns, the description; columns 14 through 18 the unit price; columns 19 through 22 the vendor code; columns 23 through 35 the part number; columns 36 through 41 the quantity; etc. This means that if the card were to be used for reordering purposes as well as in-house use, it may for example be desirable to transmit only the vendor code, purchase order number, and quantity, i.e. columns 19 through 41 in the above example. In this instance the fold line 26 would best be positioned between the 18th and 19th columns (see FIG. 2). In this manner, the terminal end of the card 25 will register with the abutments 28 and 29, and the punches 31 would then register with the afore-mentioned columns permitting transmission of only the position of the card desired. Thus for most industrial punch card setups, a single mask may suffice for transmission of the desired information.

It should also be recognized that the abutments 28 and 29 need have no particular configuration and may be simply pieces of cardboard glued to the mask to serve as stops for the terminal end of the punch card 25. In addition, it should be obvious that the abutments may be placed in any position along the longitudinal edge of the card.

In addition, the abutments may be pressed out of the mask such as the abutments 28a illustrated in FIGS. 4 and 5.

Thus the device of the present invention provides improved means and an improved method for data punch transmission which will permit, without modifying the data transmission machine, the reading and transmission of any portion of a data punch card.

Although the invention has been described with a certain degree of particularity, it is understood that the present disclosure has been made only by way of example and that numerous changes in the details of construction, the method of operation, and the combination and arrangement of parts may be made without departing from the spirit and the scope of the invention, as hereinafter claimed.

What is claimed is:

1. In a data transmission machine having punch read-out means operable to receive a punch card and automatically read-out, upon activation, only those punches in the segment of said card in registry with said means; said machine having a carriage including holding means dimensioned to receive and maintain said card in a predetermined position in said carriage; stop means insertable in said carriage and positioned to engage a terminal edge of said card whereby only a limited portion of said card may be positioned in said carriage, the position of said stop means serving to select the portion of said card registerable with said read-out means, said stop means comprising a mask having an outline substantially the same as said punch card, said mask having a plurality of punches therein for registry with selected punches in said punch card and including at least one abutment on the upper surface thereof.

2. In a data transmission machine in accordance with claim 1 wherein at least a portion of said mask underlies said punch card; a second abutment on said mask laterally spaced from said one abutment, said abutments adapted for engagement with the terminal end of a superimposed punch card.

3. In a data transmission machine in accordance with claim 2 wherein said holding means for said carriage comprises a pair of laterally spaced longitudinally extending shoes having a recessed portion, and wherein said abutments are laterally aligned and receivable in said recessed portion of said shoes.

4. Apparatus for transmission of selected indicia contained on a punch card, said punch card having a plurality of columns and punches in at least some of said columns corresponding to indicia, a mask having at least one abutment thereon, and adapted for mating in face to face engagement with a portion of said punch card when indicia is being transmitted, said abutment registerable with one terminal edge of said punch card; said mask having punches registerable with selected punches in said punch card when said punch and said mask are in mating relation whereby only said selected punches are transmitted.

5. A mask for a punch card in accordance with claim 4 wherein said punches in said mask correspond only to selected punches in a longitudinal direction of 22 columns in said card.

6. A mask for a punch card in accordance with claim 4 wherein said punches in said mask correspond only to selected punches in a longitudinal direction of 36 columns in said card.

7. A method of selecting, for dataphone transmission, indicia from a prepunched card: comprising the steps of providing a card having punches corresponding to indicia, only certain of said indicia being capable of transmission, and providing a mask having punches placed therein corresponding in location to at least some of the punches in said card, positioning abutments on said mask for engagement with the terminal edge of said card, mating said card with the portion of said mask extending from said abutments in face to face relation so that at least some of said punches in said card register with at least some of said punches in said mask.

8. A method of selecting, for dataphone transmission, indicia from a prepunched card in accordance with claim 7 including the steps of: positioning said card and mask in a data transmission unit and transmitting only the indicia on said card wherein said punches in said mask register with the punches in said card.

References Cited
UNITED STATES PATENTS

| | | | |
|---|---|---|---|
| 2,089,272 | 8/1937 | Lake et al. | 235—61.11 X |
| 3,131,259 | 4/1964 | Di Iorio et al. | 200—46 X |
| 3,185,949 | 5/1965 | Jordan | 235—61.11 X |
| 3,198,897 | 8/1965 | Scofield et al. | 200—46 |
| 3,227,818 | 1/1966 | Belaieff | 200—46 X |

DARYL W. COOK, Primary Examiner

ROBERT M. KILGORE, Assistant Examiner

U.S. Cl. X.R.

200—46; 235—61.12